United States Patent

Bizub

(10) Patent No.: US 10,126,206 B2
(45) Date of Patent: Nov. 13, 2018

(54) METHOD AND SYSTEM FOR PORTABLE ENGINE HEALTH MONITORING

(71) Applicant: General Electric Company, Schenectady, NY (US)

(72) Inventor: Jeffrey Jacob Bizub, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 14/754,206

(22) Filed: Jun. 29, 2015

(65) Prior Publication Data

US 2016/0377506 A1 Dec. 29, 2016

(51) Int. Cl.

| | |
|---|---|
| *F02D 41/28* | (2006.01) |
| *G01M 15/14* | (2006.01) |
| *G01H 1/00* | (2006.01) |
| *F02D 41/00* | (2006.01) |
| *G01M 15/04* | (2006.01) |
| *G01M 15/12* | (2006.01) |

(Continued)

(52) U.S. Cl.
CPC ............ *G01M 15/14* (2013.01); *F02D 41/009* (2013.01); *F02D 41/1498* (2013.01); *F02D 41/22* (2013.01); *F02D 41/28* (2013.01); *G01H 1/006* (2013.01); *G01M 15/046* (2013.01); *G01M 15/12* (2013.01); *F02D 2041/228* (2013.01); *F02D 2041/286* (2013.01); *Y02T 10/40* (2013.01)

(58) Field of Classification Search
None
See application file for complete search history.

(56) References Cited

U.S. PATENT DOCUMENTS

| | | | | |
|---|---|---|---|---|
| 6,725,825 | B1 * | 4/2004 | Kurtz | F02B 1/12 123/295 |
| 6,815,995 | B2 * | 11/2004 | Ajit | H03H 11/265 327/112 |
| 8,948,967 | B2 | 2/2015 | Championnet | |

(Continued)

FOREIGN PATENT DOCUMENTS

| | | |
|---|---|---|
| EP | 2302347 A2 | 3/2011 |
| WO | 3001175 A1 | 1/2003 |

OTHER PUBLICATIONS

International Search Report and Written Opinion issued in connection with corresponding PCT Application No. PCT/US2016/039927 dated Nov. 10, 2016.

*Primary Examiner* — Michael Lebentritt
(74) *Attorney, Agent, or Firm* — Fletcher Yoder, P.C.

(57) ABSTRACT

In one embodiment, one or more tangible, non-transitory computer-readable media stores instructions. The instructions, when executed by one or more processors, are configured to receive engine rotation timing event signals for one or more components of the engine and vibration signals indicative of movement of the one or more components, to synchronize the engine rotation timing event signals and the vibration signals to generate synchronized vibration signals, to determine whether a fault exists by comparing the synchronized vibration signals to vibration signatures, and to generate a graphical user interface (GUI) that depicts the synchronized vibration signals at angular positions of the one or more components in relation to time as the one or more components rotate during operation of the engine.

20 Claims, 7 Drawing Sheets

(51) Int. Cl.
    *F02D 41/14*     (2006.01)
    *F02D 41/22*     (2006.01)

(56) References Cited

U.S. PATENT DOCUMENTS

| | | |
|---|---|---|
| 8,948,977 B2 | 2/2015 | Liu et al. |
| 8,949,668 B2 | 2/2015 | Hanks et al. |
| 2001/0018846 A1 | 9/2001 | Shin |
| 2008/0306653 A1* | 12/2008 | Hasegawa .............. B62K 25/04 <br> 701/38 |
| 2012/0109457 A1* | 5/2012 | Okamoto .............. F16F 13/264 <br> 701/36 |
| 2012/0272736 A1 | 11/2012 | Griffaton |
| 2013/0304351 A1* | 11/2013 | Gillette, II ......... G01N 33/0009 <br> 701/101 |
| 2014/0005886 A1* | 1/2014 | Morris ................... B60K 35/00 <br> 701/36 |
| 2014/0344702 A1* | 11/2014 | Edge ..................... G06Q 10/10 <br> 715/730 |
| 2016/0138998 A1* | 5/2016 | Zheng ..................... G01H 3/08 <br> 73/579 |
| 2017/0213458 A1* | 7/2017 | Gordon ................. G08G 1/097 |

* cited by examiner

METHOD AND SYSTEM FOR PORTABLE ENGINE HEALTH MONITORING

BACKGROUND OF THE INVENTION

The subject matter disclosed herein relates to engine monitoring and, more specifically, to methods and systems for portable engine health monitoring.

Various engines (e.g., reciprocating and/or gas turbine engines) are widely used throughout many different industries. As the engines are used over time, their components may deteriorate and lead to inefficient operation and/or an undesirable maintenance event of the engine. In some instances, the engines do not include a way to monitor their health. In other instances, the engines may include non-movable, built-in sensors to monitor various characteristics of the components and the engines as a whole. However, the sensors that are used typically may not be placed in appropriate places or relocated on the engines to detect certain faults. Thus, it is desirable to enhance engine health monitoring.

BRIEF DESCRIPTION OF THE INVENTION

Certain embodiments commensurate in scope with the present disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In one embodiment, one or more tangible, non-transitory computer-readable media stores instructions. The instructions, when executed by one or more processors, are configured to receive engine rotation timing event signals for one or more components of the engine and vibration signals indicative of movement of the one or more components, synchronize the engine rotation timing event signals and the vibration signals to generate synchronized vibration signals, determine whether a fault exists by comparing the synchronized vibration signals to vibration signatures, and generate a graphical user interface (GUI) that depicts the synchronized vibration signals at angular positions of the one or more components in relation to time as the one or more components rotate during operation of the engine.

In one embodiment, an electronic device includes a network interface and a processor. The processor is configured to receive engine rotation timing event signals for one or more components of the engine and vibration signals indicative of movement of the one or more components from the network interface, synchronize the engine rotation timing event signals and the vibration signals to generate synchronized vibration signals, determine whether a fault exists by comparing the synchronized vibration signals to vibration signatures of the one or more components at respective angular positions, and generate a graphical user interface (GUI) that depicts the synchronized vibration signals at angular positions of the one or more components in relation to time as the one or more components rotate during operation of the engine.

In one embodiment, an apparatus includes a sensor including an adhesive or magnetic patch that enables removable coupling of the sensor to an exterior portion of an engine. The sensor is configured to detect vibration signals of one or more components that rotate as the engine operates, and transmit the vibration signals for generation of synchronized vibration signals for display via a graphical user interface (GUI) that depicts the synchronized vibration signals at angular positions of the one or more components in relation to time as one or more components rotate during operation of the engine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
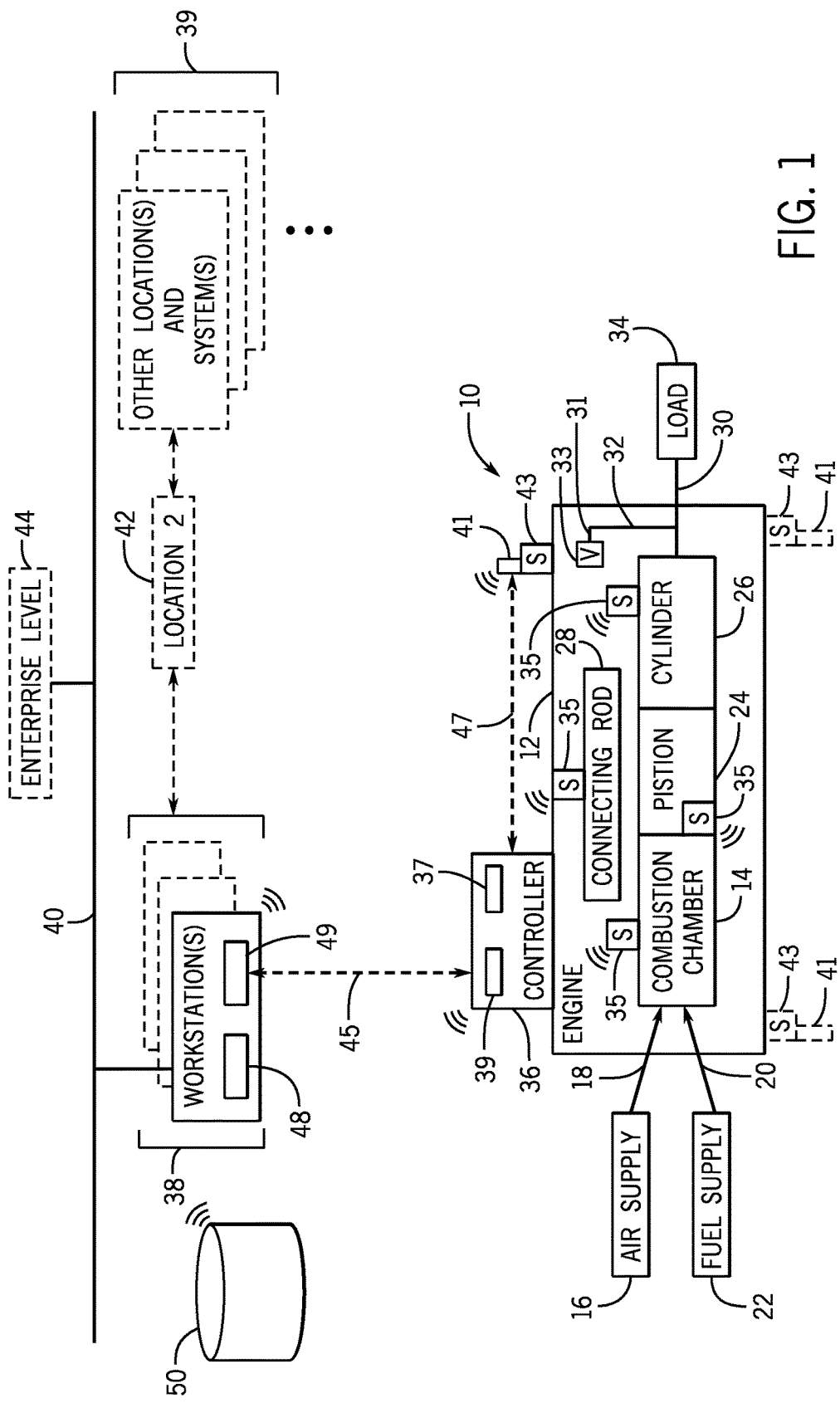
FIG. 1 is a block diagram of an embodiment of a reciprocating engine system using the disclosed portable engine health monitoring techniques, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Engines that use health monitoring techniques typically include one or more sensors (e.g., knock, thermal, current) fixed to a component of the engine. Oftentimes, the sensors are wired directly to a controller of the engine. However, there are certain places on the engine that make it difficult to secure and/or run wire to a sensor due to surrounding components, reduced surface area, and the like. Nevertheless, these places may be desirable locations to place a sensor to detect certain faults. Also, as previously mentioned, some engines lack health monitoring techniques altogether, thereby forfeiting the benefits provided by monitoring and early detection of component faults and/or failures.

Accordingly, the present disclosure relates to providing systems and methods for enhanced portable engine health monitoring to detect certain faults. In some embodiments, one or more vibration sensors (e.g., knock sensors, accelerometers) may include a magnetic strip or adhesive patch to enable removable coupling to specific locations on the engine, compressor, generator, power drive system, machine, or the like, which are targeted as sensitive locations for determining specific failures. For example, the vibration sensors may be placed at an exterior location on the engine where sonic emitted acoustics may be clearly detected for engine component (e.g., camshaft and crankshaft) movement during the angular rotation of the engine over time. The specific locations may greatly enhance the likelihood of detecting certain faults (e.g., valve faults, wrist pin faults, blade fracture faults, bearing defect faults, out of balance condition faults).

The vibration sensors may be coupled with a wireless and/or wired multi-channel transceiver (e.g., transmitter and receiver). The transceiver may be communicably coupled to an engine controller and the transceiver may receive engine rotation timing event signals from the engine controller. Additionally, the transceiver may receive vibration signals from the vibration sensor. The transceiver may be communicatively coupled with a workstation, such as an electronic device including a smartphone, tablet, portable computing device, and the like. The transceiver may transmit the engine rotation timing event signals and vibration signals to the workstation in real-time. In some embodiments, a transmitter may be used without a receiver to send the vibration signals detected by the sensor to the workstation and the engine controller may send the engine rotation timing event signals directly to the workstation. The workstation may synchronize the event rotation timing event signals and the vibration signals to generate synchronized vibration signals that reflect data from the same point in time and/or same angular position of the engine. Further, the workstation may compare the synchronized vibration signals to baseline vibration signatures and/or fault vibration signatures obtained from a data source and generate one or more graphical user interfaces (GUI) that represents the synchronized vibration signals. In some embodiments, the GUI may include a pie chart that represents signals at angular rotations of the engine over time. When the synchronized vibration signals substantially match a fault vibration signature, the GUI may raise an alert.

Benefits provided by the disclosed techniques may include enhanced detection of defects where on-engine mounted sensor arrangements are difficult to achieve. Further, the techniques provide a service tool to scan engines on site to determine their health by placing the sensor in a desirable position and monitoring the signals from the sensor on an application on the workstation (e.g., smartphone). In addition, the techniques provide for a system and method to baseline current engine designs so that new design changes may account for the vibration and acoustic resonance to determine defects.

Turning to the figures, FIG. 1 illustrates a block diagram of an embodiment of a reciprocating engine system 10 using the disclosed portable engine health monitoring techniques. The system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example transportation engines. An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and an air-fuel mixture ignites and combusts within each combustion chamber 14. As may be appreciated, the engine 12 may be a duel fuel engine which is configured to use a combination of liquid and gaseous fuel.

In some embodiments, the pressurized oxidant 18 and fuel 20 may be supplied to and mixed in an intake manifold, which supplies the air-fuel mixture to the combustion chamber 14. Also, in some embodiments, a portion of the oxidant 18 and fuel 20 may be pre-mixed in a manifold for supply to the combustion chamber 14 (e.g., for pre-ignition) in addition to a separate supply of oxidant 18 and/or fuel 20 being directly supplied to the combustion chamber. The hot pressurized combustion gases cause a piston 24 adjacent to each combustion chamber 14 to move linearly within a cylinder 26 and convert pressure exerted by the gases into a rotating motion via a connecting rod 28 connecting the piston 24 to a crank, which causes a crankshaft 30 to rotate. The crankshaft 30 may be coupled to a camshaft 31 via a timing belt 32 that controls opening and closing of valves 33 (e.g., intake, exhaust) to obtain a desired air-fuel mixture and to exhaust fumes. The camshaft 31 may turn one revolution for each two revolutions of the crankshaft 30. The crankshaft 30 may also be coupled to a load 34, which is powered via rotation of the crankshaft 30. For example, the load 34 may be any suitable device that may generate power via the rotational output of the system 10, such as an electrical generator. Additionally or alternatively, the load 34 may include a mechanical drive, compressor, pump, and the like. Once the available energy is translated into rotating the shaft 30, the remaining fuel 20 and/or oxidant 18 is vented and removed from the engine 12 as exhaust.

Various internal components of the engine 12 may include one or more attached sensors 35 (e.g., accelerometer, knock sensor, current sensor, thermal sensor) in wireless communication with a controller 36. The controller 36 may be an engine control unit (ECU) and may include one or more processors 37 configured to send a signal to a network interface to communicate with one or more workstations 38. The communication between the controller 36 and the workstation 38 may be wired (e.g. Ethernet), as shown by dashed line 45, or wireless (e.g., Bluetooth®, Dust Networks®, Z-Wave®, WiFi, and ZigBee®). Further, the controller 36 may include one or more memories 39 that store the computer instructions executed by the one or more processors 37 to perform various operations and information related to operation of the engine (e.g., timing of events). For example, a processor 37 may execute instructions to send engine rotation timing event signals for certain components of the engine (e.g., crankshaft 30 and camshaft 31) to a network interface, which sends the engine rotation timing event signals to the workstation 38 and/or a transceiver 41 of one or more portable sensors 43.

As illustrated, the internal sensors 35 may be located on any component (e.g., movable component) internal to the engine 12, including the connecting rod 28, the combustion chamber 14, the piston 24, and the cylinder 26, among others. In some embodiments, one or more of the internal sensors 35 may be configured to monitor the angular position of the crankshaft 30 and one or more internal sensors 36 may be configured to monitor the angular position of the camshaft 33. The sensors 35 and the controller 36 may communicate using a standard network protocol, such as Bluetooth®, Dust Networks®, Z-Wave®, WiFi, and Zig-Bee® via respective communication components. Other wireless communication technologies that may be used are infrared and radio. It should be appreciated that using a wireless communication protocol to relay data from the sensors 35 to the controller 36 may enable the sensors to be placed on components internal to the engine 12 where it would be difficult to run wires. Further, using Bluetooth® based sensors 35 enables placing the sensors 35 on components of the engine 12 that may move and/or rotate, such as the connecting rod 28. For example, if wires were connected to the sensors 35 on the movable components, the wires might become tangled and disconnect from the sensor 35 and/or the controller 36.

The portable sensors 43 may be located on any external portion to the engine 12, such as the engine housing. The sensors 43 may be located in places where it is difficult to run wiring due to engine component movement but there is a desire to obtain information from that place on the engine 12. In some embodiments, the sensors 43 are placed at a location to detect the position of the camshaft 31 and/or the crankshaft 30. The sensors 43 are portable in the sense that they may be removably coupled to a location, as shown by the dashed sensors 43 and transceivers 41. The portability may enable performing periodic check-ups on an engine 12 to ascertain its health without having to permanently add additional components to the engine and/or without having to continuously power additional components. For example, in embodiments where the sensors 43 are adhesive patches, the sensors 43 may be attached to a location on the engine 12 and then later peeled off to be placed in another location or stored for later use. Likewise, in embodiments where the sensors 43 are magnetic patches, the sensors 43 may be positioned on any attractive material (e.g., metal, alloy, copper) of the engine 12 and moved to different locations as desired.

The sensors 43 may include an integrated microelectromechanical system (MEMS), piezo-electric, or other accelerometer/microphone with an analog-to-digital converter to obtain vibration/sound information. In some embodiments, the sensors 43 include knock sensors suitable for detecting engine "knock." The sensors 43 may be any sensor configured to sense vibrations caused by the engine 10, such as vibration due to detonation, pre-ignition, and or pinging.

The transceiver 41 may be a separate component that is electrically coupled to the sensor 43 and physically secured to the sensor 43 (e.g., via a pigtail harness). In some embodiments, the transceiver 41 may be included internally within the sensor 43. The transceiver 41 and the controller 36 may communicate using a standard network protocol, such as Bluetooth®, controller area network (CAN), Dust Networks®, Z-Wave®, WiFi, and ZigBee® via respective communication components. In some embodiments, the portable sensor 43 may not use the transceiver 41 and the sensor 43 may be directly wired to the controller 36 (e.g., via Ethernet), as shown by the dashed line 47.

Additionally, the transceiver 41 may transmit the vibration/sound data obtained from the sensor 43 in real-time over the communication network (e.g., Voice over IP (VOIP, audio over CAN, Bluetooth®) to the workstation 38. Further, the transceiver 41 may receive engine rotation timing event signals of the engine 12 from the controller 36 and transmit the engine rotation timing event signals to the workstation 38. In some embodiments, a transmitter may be used in place of the transceiver. In such an embodiment, the transmitter may send the vibration/sound data obtained from the sensor 43 and the controller 36 may send the engine rotation timing event signals directly to the workstation 38. Additionally, in some embodiments, the sensor 43 may include either the transceiver 41 or the transmitter (for example, the sensor 43 and transceiver 41 or the transmitter may be housed in a common enclosure). As described in detail below, the workstation 38 may execute a software application that synchronizes the vibration signals with the engine rotation timing event signals to generate synchronized vibration signals and compares the synchronized vibration signals to a baseline and/or performs specific digital signal processing (DSP) techniques to determine specific faults. The application may generate a GUI that represents the synchronized vibration signals and that provides alerts when faults are detected.

In some embodiments, the transceiver 41 may be enabled for multi-channel (e.g., 4, 4.1, 5, 5.1) communication. For example, one or more channels may be used for data communication with sensors 35 placed on internal components (e.g., crankshaft 30, camshaft 33) of the engine 12, one or more channels may be used for data communication with the portable sensors 43 on the exterior of the engine 12, one channel may be used for data communication with the controller 36, another channel may be used for communication with the workstation 38, and so forth.

In some embodiments, when the workstation 38 is activated or connects to a network to which the transceiver 41 and/or the controller 36 are connected, the workstation 38 may perform an initialization and handshake process with each transceiver 41 and the controller 36. For example, the workstation 38 may contact each transceiver 41 and/or the controller 36 individually and transmit a command instruction for the transceiver 41 and/or the controller 36 to activate, if not already activated. Upon transceiver 41 and/or controller 36 activation, the workstation 43 may perform a pairing and authentication handshake process with the transceivers 41 and/or the controller 36. In some embodiments, the pairing and authentication handshake process may only occur the first time the workstation 43 connects to the transceivers 41 and/or the controller 36.

Once the workstation 38 is wirelessly connected to the transceivers 41 and/or the controller 36 and able to communicate data, the workstation 38 may request certain information from the transceiver 41 or the transceiver 41 may transmit certain information by default. The information may relate to the type of sensor 43 (e.g., accelerometer, thermal), the power source used by the sensor 43, the type of data the sensor 43 transmits (e.g., kind, size), the transmission schedule (e.g., near real-time), the engine location where the sensors 43 are removably coupled, data obtained from the sensor 43 (e.g., vibration signals), and the like. In addition, the workstation 38 may request certain information from the controller 36 or the controller 36 may transmit certain information by default. For example, the information may include engine rotation timing event signal. Further, in embodiments where a transmitter is used instead of the transceiver, the transmitter may be communicably coupled to the workstation 38. The workstation 38 may request certain information from the transmitter or the transmitter may transmit certain information by default. The information may relate to the type of sensor 43 (e.g., accelerometer, thermal), the power source used by the sensor 43, the type of data the sensor 43 transmits (e.g., kind, size), the transmission schedule (e.g., near real-time), the engine location where the sensors 43 are removably coupled, data obtained from the sensor 43 (e.g., vibration signals), and the like.

Also, in some embodiments, when the controller 36 is activated or connects to a network to which the transceivers 41 are connected, the controller 36 may perform an initialization and handshake process with each transceiver 41. For example, the controller 36 may contact each transceiver 41 individually and transmit a command instruction for the transceiver 41 to activate, if not already activated. Upon transceiver 41 activation, the controller 36 may perform a pairing and authentication handshake process with the sensors 43. In some embodiments, the pairing and authentication handshake process may only occur the first time the controller 36 connects to the transceivers 41. Once the controller 36 and the transceivers 41 are wirelessly connected and able to communicate data, the controller 36 may request certain information about the transceivers 41 or their respective coupled sensors 43 from the transceivers 41, or the transceivers 41 may transmit certain information by default. The information may relate to the type of sensor 43 (e.g., accelerometer, thermal), the power source used by the sensor 43, the type of data the sensor 43 transmits (e.g., kind, size), the transmission schedule, the engine location where the sensors 43 are removably coupled, and the like. The controller 36 may send engine rotation timing event signals to the transceiver 41 in near real-time as the controller 36 executes instructions to operate the engine 12. The transceiver 41 may transmit the engine rotation timing event signals along with any vibration signals acquired from the sensor 43 to the workstation 38

The workstation 38 may include one or more processors 48 configured to execute instructions stored on one or more memories 49. The workstation 38 may also include a network interface configured to communicate wirelessly and/or wired with other electronic devices, such as the controller 36 and the transceiver 41. In some embodiments, the workstation 38 may be communicatively coupled to a knowledge database 50 that resides on an external server and that stores vibration signatures indicative of faults. In other embodiments, the knowledge database 50 may be stored in the one or more memories 49 of the workstation 38. Additionally or alternatively, the knowledge database 50 may be stored in the one or more memories 39 of the controller 36.

The instructions stored on the memories 49 may be utilized in performing the disclosed techniques. For example, as will be described in detail below, in one embodiment, the instructions may cause synchronization of the engine rotation timing event signals with the vibration signals to generate synchronized vibration signals that represent data from the same point in time. Once the signals are synced, the instructions may cause access of the knowledge database 50 and comparison of the synchronized vibration signals to baseline vibration signatures for normal operation and for particular faults of the component with which the signals are associated and angular rotation of the engine during an event (e.g., intake, combustion, power, exhaust). If the synchronized vibration signals substantially match a fault vibration signature, then the workstation 38 may take one or more actions, such as generate an alert on a GUI to display on a user interface screen included with the workstation 38. If the synchronized vibration signals do not substantially match the fault vibration signature for the component and do not substantially match the baseline normal vibration signature for the component at a particular angular rotation of the engine in time, then the workstation 38 may write the new vibration signature to the knowledge database 50 as indicative of a fault.

As depicted, the workstation 38 may be located in the same site, plant, factory, etc. ("location 1") as the system 10. Additionally, the workstation 38 may be capable of communicating with workstations 38 external to location 1 and other locations and systems 39 over a network 40 (e.g., Internet). The various workstations 38, locations (42), and other locations and systems 39 may all communicate with one another and data related to each system may be stored at an enterprise level 44 via network 40. For example, at the enterprise level 44, an entity may maintain engines running at any number of locations by monitoring the data received from the workstations 38 and may track which engines experience faults, the type of faults, the frequency of the faults, and the like.

Figure 2:
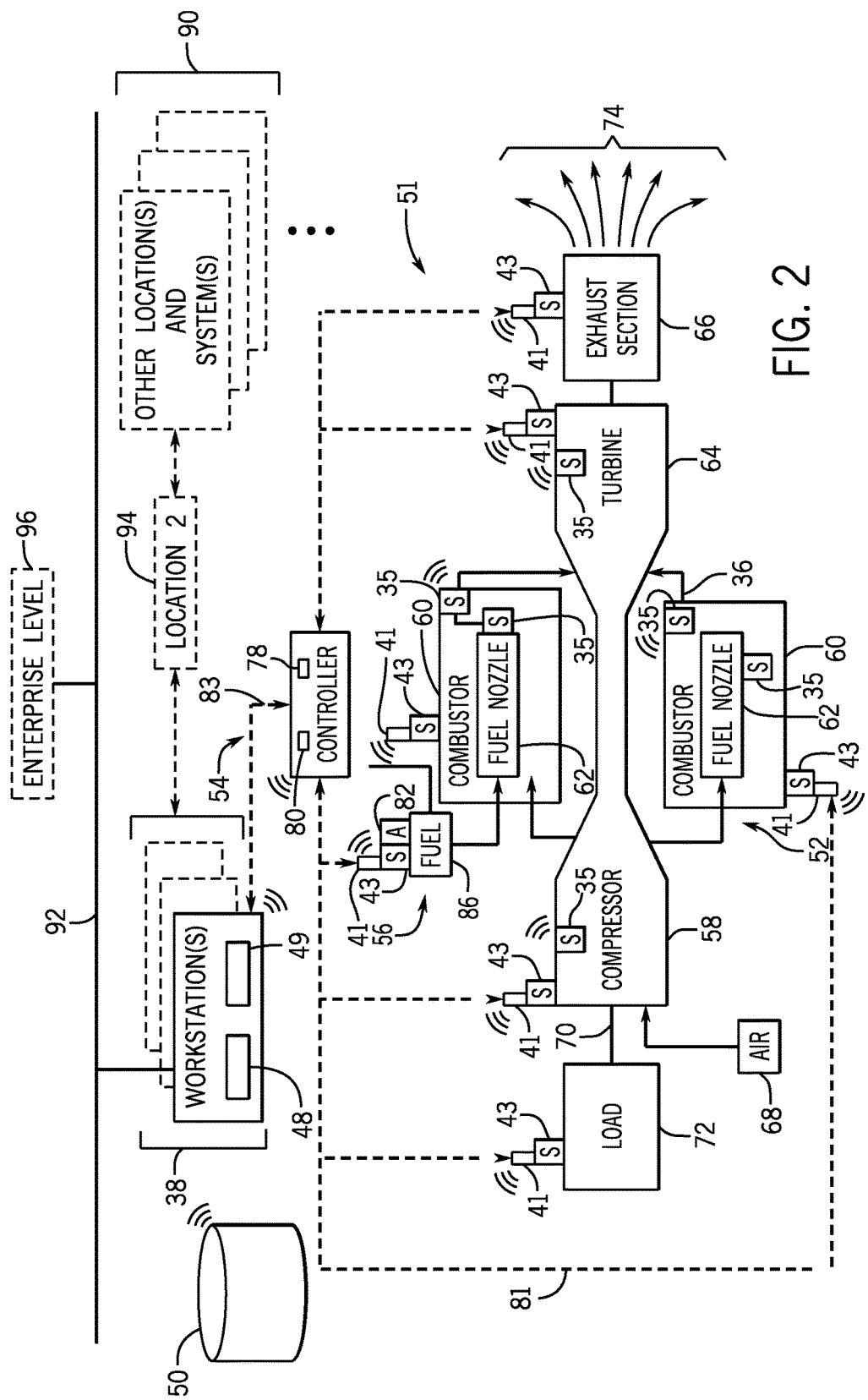
FIG. 2 is a block diagram of an embodiment of a gas turbine engine system using the disclosed portable engine health monitoring techniques, in accordance with embodiments of the present disclosure.

FIG. 2 is a block diagram of an embodiment of a gas turbine engine system 51 using the disclosed portable engine health monitoring techniques. In certain embodiments, the gas turbine engine system 51 may include a gas turbine 52, a controller 54 (e.g., engine control unit), and a fuel supply system 56. As illustrated, the gas turbine 52 may include a compressor 58, combustion system 60, fuel nozzle 62, turbine 64, and exhaust section 66. During operation, the gas turbine 52 may intake gas (e.g., air) 68 into the compressor 58, which then compresses the air 68 and moves it to the combustion system 60 (e.g., a plurality of combustors). In the combustion system 60, the fuel nozzle 62 (or a plurality of fuel nozzles 62) injects fuel that mixes with the compressed air creating an air-fuel mixture. The air-fuel mixture may combust in the combustion system 60 to generate hot combustion gases, which flow downstream into the turbine 64 to drive one or more turbine 64 stages. For example, the combustion gases move through the turbine 64 to drive one or more stages of turbine 64 blades, which in turn drive rotation of shaft 70. The shaft 70 connects to a load 72, such as a generator that uses the torque of the shaft 70 to produce electricity. After passing through the turbine 64, the hot combustion gases may vent as exhaust gases 74 into a bottoming cycle system (e.g., HRSG), through the exhaust section 66.

In certain embodiments, the controller 54 may include a processor 78, a memory 80, a hardware interface (not shown) suitable for interfacing with the actuators 82 and the internal sensors 35, and a communication component (not shown) suitable for wirelessly communication with electronic devices. Accordingly, the controller 54 may be wirelessly communicatively coupled to the sensors 35, the transceivers 41 of the sensors 43, and/or the workstations 38 via any suitable wireless technology (e.g., Bluetooth®), such that the controller 54 may send information (e.g., engine rotation timing event signals) to the transceivers 41 and/or workstations 38 in near real-time. In embodiments where the sensor 43 lacks a transceiver 41, the sensor 43 may be directly wired (e.g., Ethernet) to the controller 54, as shown by dashed lines 81. Also, the controller 54 may be directly wired (e.g., Ethernet) to the workstations 38, as show by dashed lines 83. In embodiments where a transmitter in used instead of the transceiver 41, the controller 54 may send the engine rotation timing event signals directly to the workstation 38 and the transmitter may send vibration signals obtained from the sensors 43 to the workstation 38. The memory 80 (e.g., tangible, non-transitory computer-readable medium) may store computer instructions that perform various operations to control the engine system 51.

As illustrated, the wireless sensors 35 may be attached to numerous internal components in the system 51, such as the combustion system 60, the fuel nozzle 62, the compressor 58 and internal components of the compressor (e.g., compressor blades), the turbine 64 and internal components of the turbine (e.g., turbine blades), and so forth. The portable sensors 43 may be removably coupled to any suitable location on the exterior portions of the engine system 51, such as the fuel supply system 56, the combustor 60, the load 72, the exhaust section 66, the turbine 64, the compressor 58, and the like.

The controller 54 may send engine rotation timing event signals to the workstations 38 and/or transceivers 41 continuously or on a periodic basis as requested. Additionally, the transceivers 41 may be communicatively coupled to the workstations 38 over any suitable network, as described above. As the portable sensors 43 obtain data related to the condition of the engine 12, the transceivers 41 may transmit the data in near real-time to the workstation 38 for analysis.

The workstation 38 may include one or more processors 48 configured to execute instructions stored on one or more memories 49. In one embodiment, the instructions may cause synchronization of the engine rotation timing event signals received from either the controller 54 or the transceiver 41 with the vibration signals received from the transceiver 41 to generate synchronized vibration signals that represent data from the same point in time. Once the signals are synced, the instructions may cause comparison of the synchronized vibration signals to the knowledge database 50 that includes vibration signatures for particular faults of the component with which the synchronized vibration signals are associated and angular rotation of the engine during an event (e.g., intake, combustion, power, exhaust). As previously discussed, the knowledge database 50 may reside on an external server. In other embodiments, the knowledge database 50 may be stored in the one or more memories 49 of the workstation 38. Additionally or alternatively, the knowledge database 50 may be stored in the one or more memories 80 of the controller 54. If the synchronized vibration signals substantially match a fault vibration signature, then the processor 48 of the workstation 38 may take one or more actions, such as generate an alert on a GUI to display on a display screen included with the workstation 38.

As a result, a user operating the workstation 38 may perform a preventative action, such as deactivating the engine system 51, scheduling maintenance, or the like. As previously noted, using wireless based portable sensors 43 with transceivers 41 enables monitoring data specific to certain components of the engine 12 that may be inaccessible to wires and/or incompatible with wires. Further, the disclosed techniques may enable detecting certain conditions while the system 51 is operational, which may inhibit the condition from worsening and potentially causing an undesirable maintenance event.

As described above with regards to the reciprocating engine system 10, the workstation 38 may be located in the same site, plant, factory, etc. ("location 1") as the gas turbine engine system 51. However, the workstations 38 and/or the controller 54 may be capable of communicating with workstations external to location 1 and other locations and systems 90 over a network 92 (e.g., Internet). The workstations 38 and/or the controller 54 may wirelessly communicate with other components located in "location 2" 94 and/or other locations and systems 90. The various workstations 38, locations (94), and other locations and systems 90 may all communicate with one another and data related to each system may be stored at an enterprise level 96 via network 92. For example, at the enterprise level 96, an entity may maintain engines running at any number of locations by monitoring the data received from the workstations 38 and may track which engines experience faults, the type of faults, the frequency of the faults, and the like.

Figure 3:
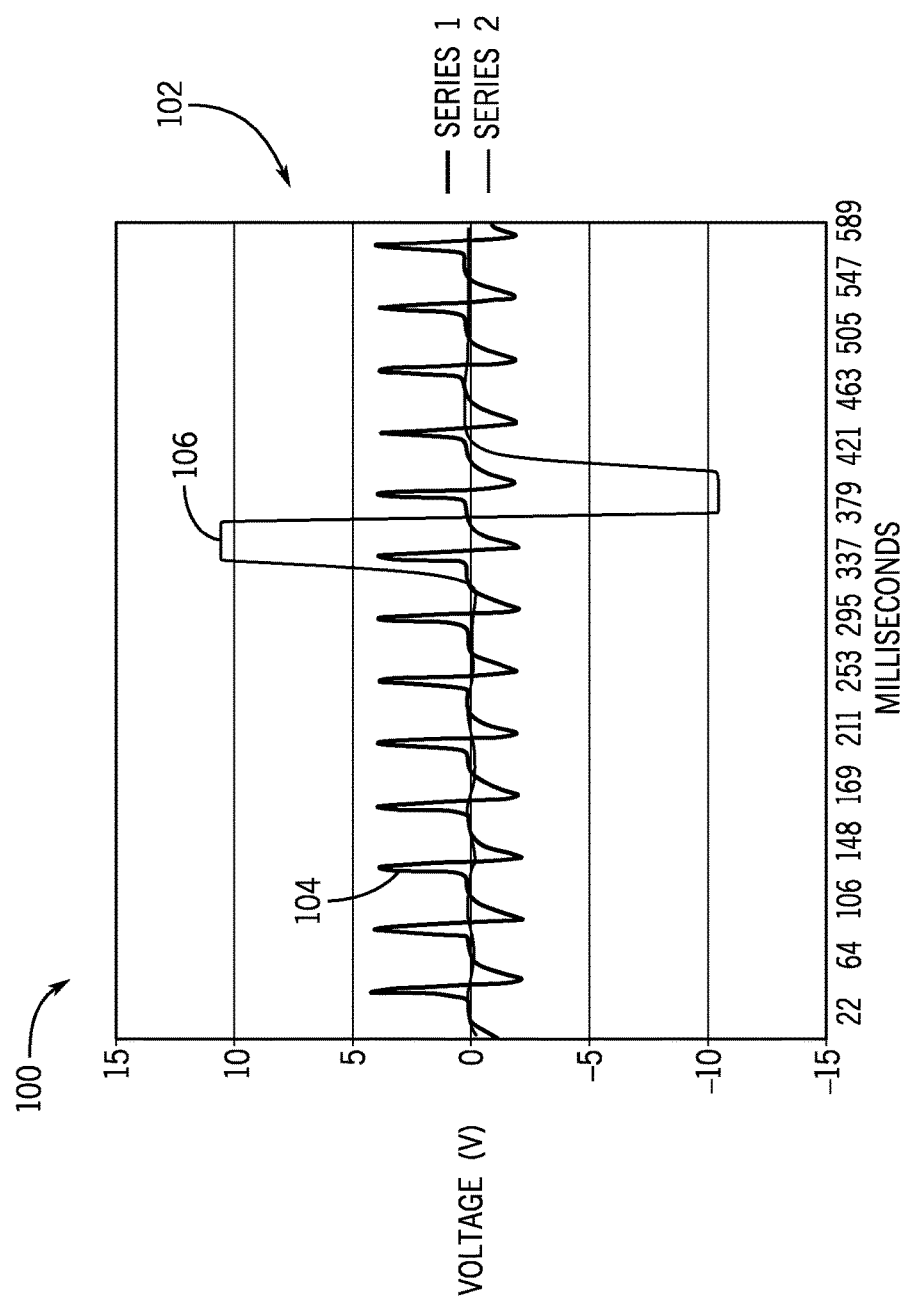
FIG. 3 is a graph illustrating a waveform including engine rotation timing event signals for a crankshaft and a camshaft, in accordance with embodiments of the present disclosure.

FIG. 3 is a graph 100 illustrating a waveform 102 that includes engine rotation timing event signals for the crankshaft 30 and the camshaft 31, in accordance with the present techniques. It should be understood that the engine rotation timing event signals may be associated with any component of the system 10 from FIG. 1 and the system 52 from FIG. 2 and a similar graphical user interface (GUI) may be generated using the signals. For example, the engine rotation timing event signals may be for revolutions per minute (RPM) that are indicative of the shaft 70 speed or the turbine blade speed in FIG. 2. It should be understood, that, in some embodiments, the graph 100 may include engine rotation timing event signals for the shaft and/or the turbine blade instead of for the crankshaft 30 and the camshaft 31. For purposes of discussion, the remainder of the description focuses on rotation timing event signals and vibration signals for the crankshaft 30 and the camshaft 31. The graph 100 includes voltages on the Y-axis and milliseconds on the X-axis. It should be understood that the engine rotation timing event signals may indicate the expected normal signal signatures for the crankshaft 30 and camshaft 31 at particular points in time or at angular positions during rotation of the engine. For example, the engine rotation timing event signals may include timings that the crankshaft 30 and the camshaft 31 will rotate angular positions during a power stroke, an exhaust stroke, an intake stroke, and a compression stroke of the engine 12.

As discussed above, the engine rotation timing event signals may be received at the workstations 38 from the controller (36, 54), the transceivers 41, or both. Further, vibration signals obtained by the portable sensors 43 may be received at the workstations 38 from the transceiver 41. In some embodiments, the workstation 38 may synchronize the engine rotation timing event signals with the vibration signals to generate synchronized vibration signals to compare the signals from the same point in time. The synchronized vibration signals may be compared to vibration amplitudes and signatures in the knowledge database 50 that are acceptable based on the component (e.g., crankshaft 30 and camshaft 31). For example, the synchronized vibration signals may be compared to the acceptable vibration signature at the same time, the synchronized vibration signals may be compared to the acceptable vibration signature at the same angular position of the engine, or both.

As depicted, the waveform 102 includes a crankshaft timing signal 104 and a camshaft timing signal 106 overlayed on one another to represent expected signal behavior of the crankshaft 30 and camshaft 31 at respective times throughout a revolution of the engine 12. In some embodiments, there may be thirty-six pulses for the crankshaft timing signal 104 per revolution of the engine 12 and there may be one pulse for the camshaft timing signal 106 per revolution of the engine 12. For four stroke engines, there may be seventy-two pulses for the crankshaft timing signal 104 and one pulse for the camshaft timing signal 106. As should be appreciated, faults may be determined by the processor 48 when the engine rotation timing event signals are synced with the vibration signals to generate synchronized vibration signals and the synchronized vibration signals do not substantially match the engine rotation timing event signals at a particular point in time during engine rotation, at a particular angular position of the engine, or both.

Figure 4A:
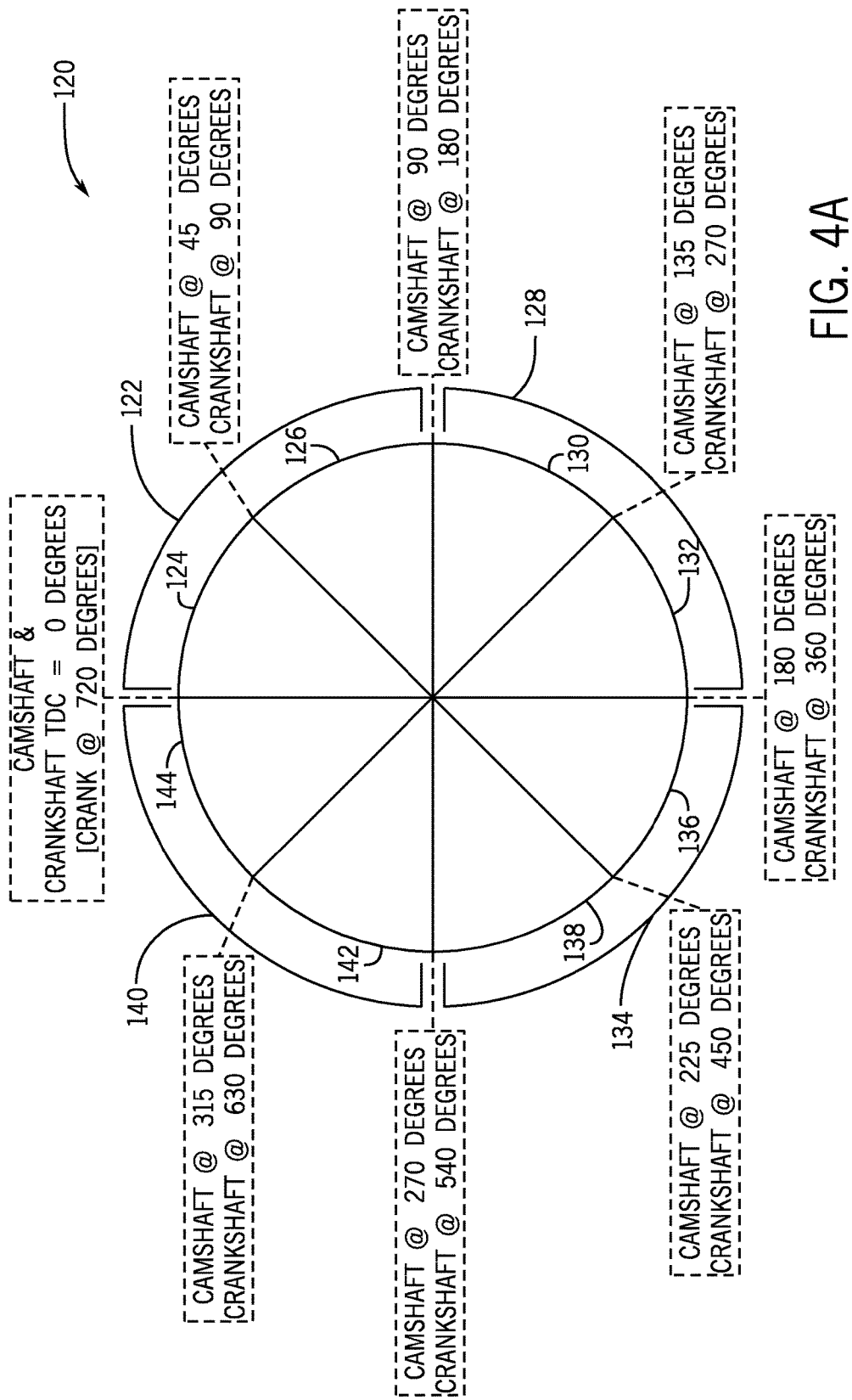
FIGS. 4A-4C illustrate a pie chart graphical user interface (GUI) that represents synchronized vibration signals in relation to angular rotations of components of the engines of FIGS. 1 and 2 over time, in accordance with embodiments of the present disclosure.
Figure 4B:
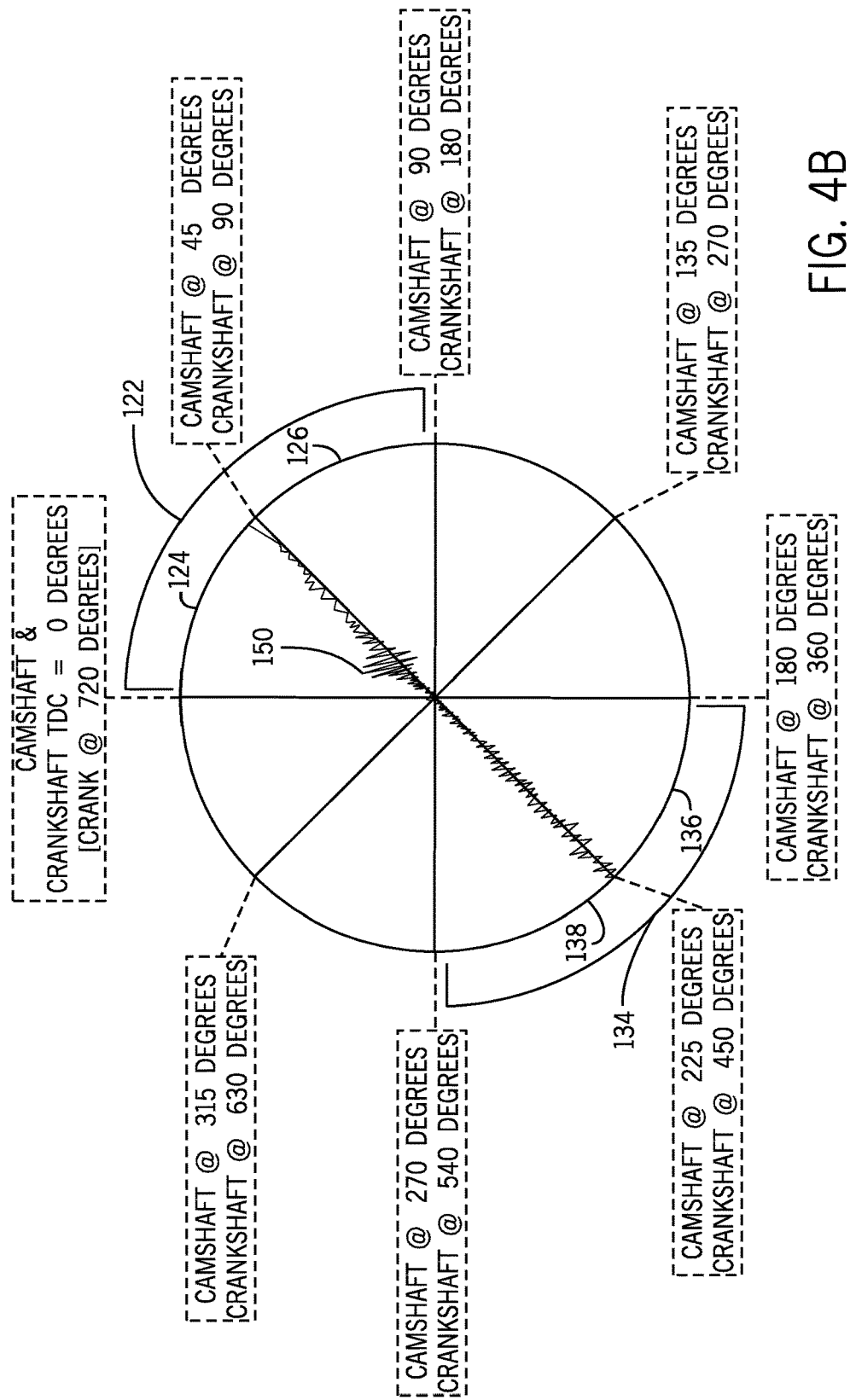
Figure 4C:
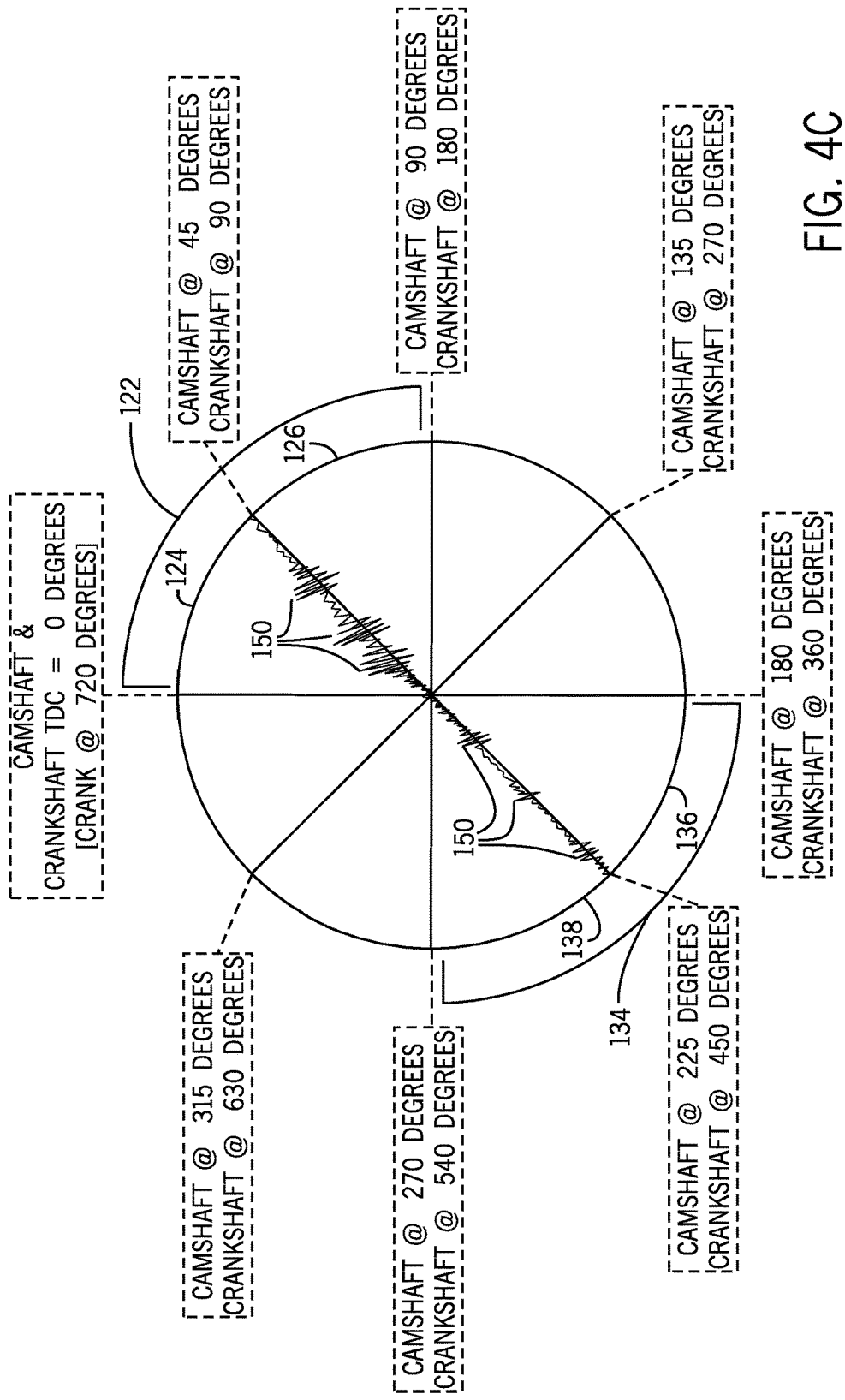

FIGS. 4A-4C illustrate a pie chart graphical user interface (GUI) 120 that represents synchronized vibration signals in relation to angular rotations of components of the engines of FIGS. 1 and 2 over time, in accordance with the present techniques. Although the pie chart GUI 120 illustrated in FIGS. 4A-4C relates to the angular rotations of the crankshaft 30 and camshaft 31, it should be understood that a similar pie chart GUI 120 may be generated that represents synchronized vibrations signals in relation to angular rotations of the shaft 70 and/or the turbine blade of the gas turbine 52. However, for purposes of discussion only, the remainder of the description of FIGS. 4A-4C focuses on the engine rotation timing event signals and synchronized vibration signals for the crankshaft 30 and the camshaft 31.

The pie chart GUI 120 may be generated by the processor 48 of the workstation executing instructions stored on the memory 49 and may be displayed on a display screen of the workstation 38. In some embodiments, a separate pie chart GUI 120 may be generated for each cylinder of the engine 12. For example, in a twelve cylinder engine, twelve pie chart GUI's may be generated and arranged on a display screen. In the depicted embodiments, the pie chart GUI 120 represents two rotations (720°) of the crankshaft 30 and one rotation (360°) of the camshaft 31 as the engine 12 cycles through four strokes (e.g., power, exhaust, intake, compression).

FIG. 4A illustrates the pie chart GUI 120 without any synchronized vibration signals displayed. In the depicted embodiment, each slice of the pie chart GUI 120 represents a different angular position of the crankshaft 30 and the camshaft 31, which may enable a visualization that clearly depicts synchronized vibration signals as the crankshaft 30 and the camshaft 31 rotate through the four strokes of the engine 12. In some embodiments, the pie chart GUI 120 may include a slice for each stroke of the engine 12 and each stroke slice may include a first and a second mid stroke slices. For example, the pie chart GUI 120 may include a power stroke slice 122 that includes a first mid-power stroke slice 124 and a second mid-power stroke slice 126, an exhaust stroke slice 128 that includes a first mid-exhaust stroke slice 130 and a second mid-exhaust stroke slice 132, an intake stroke slice 134 that includes a first mid-intake stroke slice 136 and a second mid-intake stroke slice 138, and a compression stroke slice 140 that includes a first mid-compression stroke slice 142 and a second mid-compression stroke slice 144.

It should be noted that, in some embodiments, each stroke slice 122, 128, 134, and 140 may represent a rotation of 90° in angular position of the camshaft 31 and a rotation of 180° in angular position of the crankshaft 30. Also, each mid stroke slice may represent a rotation of 45° in angular position of the camshaft 31 and a rotation of 90° in angular position of the crankshaft 30. Also, although four strokes are shown below, it should be understood that the disclosed techniques may apply for any number of strokes (e.g., 2, 4, 6).

The power stroke may commence when combustion occurs while the piston is at top dead center (TDC), thereby firing the piston downwards toward bottom dead center (BDC). Those skilled in the art may understand TDC as the position of the piston when it is farthest from the crankshaft 30 and BDC as the position of the piston when it is closest to the crankshaft 30. Accordingly, the power stroke slice 122 may begin when the piston is at top dead center (TDC) and the crankshaft 30 and the camshaft 31 have an angular position of 0° and may cover the time period when the camshaft 31 and crankshaft 30 rotate to angular positions of 90° and 180°, respectively. Thus, the first mid-power stroke slice 124 may cover the time period when the camshaft 31 is rotated to an angular position of 45° and the crankshaft 30 is rotated to an angular position of 90°. The second mid-power stroke 126 may cover the time period when the camshaft 31 is rotated to an angular position of 90° and the crankshaft 30 is rotated to an angular position of 180°, thereby ending the power stroke slice 122. At the end of the power stroke slice 122, the piston may be at BDC.

The exhaust stroke may commence when the piston is near BDC and begins rising upwards towards TDC while the exhaust valve is opened to release burned gases. As such, the exhaust stroke slice 128 may begin with the camshaft 31 and crankshaft 30 in the same angular position that they were in at the end of the power stroke slice 122 (e.g., camshaft 31 at 90° and crankshaft 30 at 180°) and may cover the time period when the camshaft 31 and crankshaft 30 rotate to angular positions of 180° and 360°, respectively. Thus, the first mid-exhaust stroke slice 130 may cover the time period when the camshaft 31 is rotated to an angular position of 135° and the crankshaft 30 is rotated to an angular position of 270°. The second mid-exhaust stroke slice 132 may cover the time period when the camshaft 31 is rotated to an angular position of 180°, and the crankshaft 30 is rotated to an angular position of 360°, thereby ending the exhaust stroke slice 128. At the end of the exhaust stroke slice 128, the piston may be at TDC.

The intake stroke may commence with the intake valve opening to allow outside air pressure to equalize the reduced pressure in the cylinder while the piston descends towards BDC. As such, the intake stroke slice 134 may begin with the camshaft 31 and crankshaft 30 in the same angular position that they were in at the end of the exhaust stroke slice 128 (e.g., camshaft 31 at 180° and crankshaft 30 at) 360° and may cover the time period when the camshaft 31 and crankshaft 30 rotate to angular positions of 270° and 540°, respectively. Thus, the first mid-intake stroke slice 136 may cover the time period when the camshaft 31 is rotated to an angular position of 225° and the crankshaft 30 is rotated to an angular position of 450°. The second mid-intake stroke slice 138 may cover the time period when the camshaft 31 is rotated to an angular position of 270° and the crankshaft 30 is rotated to an angular position of 540°, thereby ending the intake stroke slice 134. At the end of the intake stroke slice 134, the piston may be at BDC.

The compression stroke may commence when all valves are closed while the piston is moving towards TDC, thereby compressing the air or air-fuel mixture into the cylinder head. As such, the compression stroke slice 140 may begin with the camshaft 31 and crankshaft 30 in the same angular position that they were in at the end of the intake stroke slice 134 (e.g., camshaft 31 at 270° and crankshaft 30 at 540°) and may cover the time period when the camshaft 31 and crankshaft 30 rotate to angular positions of 360° and 720°, respectively. Thus, the first mid-compression stroke slice 142 may cover the time period when the camshaft 31 is rotated to an angular position of 315° and the crankshaft 30 is rotated to an angular position of 630°. The second mid-compression stroke slice 144 may cover the time period when the camshaft 31 is rotated to an angular position of 360° and the crankshaft 30 is rotated to an angular position of 720°, thereby ending the compression stroke slice 140. At the end of the compression stroke slice 140, the piston may be at TDC, and the engine is ready to repeat the cycle by returning to the power stroke.

In the depicted pie chart GUI 120, the strokes are depicted as occurring in sequential order as the crankshaft 30 rotates through its angular positions from 0° to 720° and as the camshaft 31 rotates through its angular positions from 0° to 360°, but it should be understood that the stroke slices may be arranged in any suitable manner. Further, depending on the configuration of the engine 12, the stroke slices may be associated with different angles as appropriate. For example, the intake stroke slice 134 may be associated with the time period where the camshaft 31 rotates angular positions from 0° to 90° and the crankshaft 30 rotates angular positions from 0° to 180°, the compression stroke slice 140 may be associated with the time period where the camshaft 31 rotates angular positions from 90° to 180° and the crankshaft 30 rotates angular positions from 180° to 360°, the power stroke slice 122 may be associated with the time period where the camshaft 31 rotates angular positions from 180° to 270° and the crankshaft 30 rotates angular positions from 360° to 540°, and the exhaust stroke slice 128 may be associated with the time period where the camshaft 31 rotates angular positions from 270° to 360° and the crankshaft 30 rotates angular positions from 540° to 720°. To that end, the pie chart GUI 120 may be configurable so that a user may choose how the pie chart GUI 120 is arranged. In some embodiments, not all of the stroke slices may be displayed and only those that are of interest may be selected to be displayed.

It should be noted that, even though the piston is at any given position twice within the four strokes, the vibration signatures may vary dramatically based on which stroke the engine is on. For example, as will be described below, certain faults may have two vibration signatures, one that appears during "loaded" events and one that appears during "unloaded" events. "Loaded" events refer to firing events (e.g., when the engine is firing during combustion), such as the power stroke. "Unloaded" events refer to non-firing events, such as the exhaust, intake, and combustion strokes. By comparing the vibration signatures on a 360° pie chart GUI 120 indicative of the four strokes of an engine cycle, it enables an easier diagnosis and a technique to show "loaded" and "unloaded" vibration signatures.

To illustrate, FIG. 4B depicts normal vibration signatures during the power stroke and the intake stroke. For example, during the power stroke slice 122, a normal vibration signature is depicted when the camshaft 31 is at an angular position of 45° and the crankshaft 30 is at an angular position of 90° in between mid-power stroke slices 124 and 126 when the piston is descending towards BDC. Additionally, during the intake stroke slice 134, a normal vibration signature is depicted when the camshaft 31 is at an angular position of 275° and the crankshaft 30 is at an angular position of 450° in between mid-intake stroke slices 136 and 138. The vibration signatures may be determined to be "normal" by the processor 48 of the workstation 38 because the signatures substantially match a vibration signature not indicative of a fault stored in the knowledge database 50, do not substantially match a fault vibration signature stored in the knowledge database 50, or both.

As previously mentioned, the power stroke may be referred to as a "loaded" event and the intake stroke may be referred to as an "unloaded" event. As illustrated, the normal vibration signature during the loaded event includes a spike 150 where the amplitude is larger than the normal vibration signature during the unloaded event. Firing the piston from TDC to BDC during combustion may cause the larger amplitudes, which may be expected vibration signal behavior.

An embodiment of abnormal vibration signatures during the power stroke and the intake stroke is shown in FIG. 4C.

As depicted, during the power stroke slice 122, the abnormal vibration signal may include two additional spikes 150 where the amplitude is larger than the normal vibration signature displayed in FIG. 4B. Also, during the intake stroke slice 134, the abnormal vibration signal may include spikes 150 where the amplitude is larger than the normal vibration signature displayed in FIG. 4B. In the depicted embodiment, the processor 48 of the workstation 38 may have synced the engine rotation timing event signals and the vibration signals to generate synchronized vibration signals and compared the synchronized vibration signals to vibration signatures in the knowledge database 50. Based on the comparison, the processor 48 may determine that the synchronized vibration signals are similar to an abnormal vibration signature that indicates a loose wrist pin fault and the processor generates the GUI 120 as a result. A loose wrist pin fault may occur when the piston wrist pin becomes loose and the piston moves laterally, thereby potentially contacting the cylinder and causing noise. However, it should be understood that any fault (e.g., valve fault) may be detected if vibration signatures indicative of the type of fault are stored in the knowledge database 50. As previously mentioned, if an abnormal vibration signature is detected and there is not a substantially matching fault vibration signature for the angular position of the camshaft 31 and crankshaft 30 in the knowledge database 50, then the abnormal vibration signature at that point in the engine cycle may be recorded to the database 50 and the fault may be defined (e.g., after examining the engine 12 and diagnosing the cause of the noise).

As previously discussed, In some embodiments, for the gas turbine 52 of the gas turbine engine system 51, the pie chart GUI 120 may be generated by the processor 48 that depicts vibration signatures for the revolutions per minute (RPM) signal that indicates the shaft 70 speed and/or the turbine blade speed similarly to and in place of the crankshaft 30 and the camshaft 31 as illustrated in FIGS. 4A-4C. As may be appreciated, gas turbines 52 may operate continuously on a rotational basis. As such, the pie chart GUI 120 for the gas turbine 52 may include two slices that tracks the vibration signatures at both 90° apart and 180° apart (e.g., each slice represents an angular position of 90° of the shaft 70, the turbine blade, or both). The processor 48 may synchronize the vibration signals with engine rotation timing event signals to generate synchronized vibration signals and compare the synchronized vibration signals to vibration signatures in the knowledge database 50. Based on the comparison, the processor 48 may determine that the synchronized vibration signals are similar to an abnormal vibration signature that indicates one or more faults of the gas turbine 52, such as blade fracture, bearing defects, out of balance conditions, and so forth.

In some embodiments, when a fault is detected, the pie chart GUI 120 may raise an alert (e.g., visual, audible). For example, the GUI 120 may change the color (e.g., orange, red) of the vibration signature, the actual slice where the fault is detected, or both. Also, the GUI 120 may display text indicative of the fault. In addition, the processor 48 may cause emission of an audible sound such as a warning statement, a beeping noise, or both.

Figure 5:
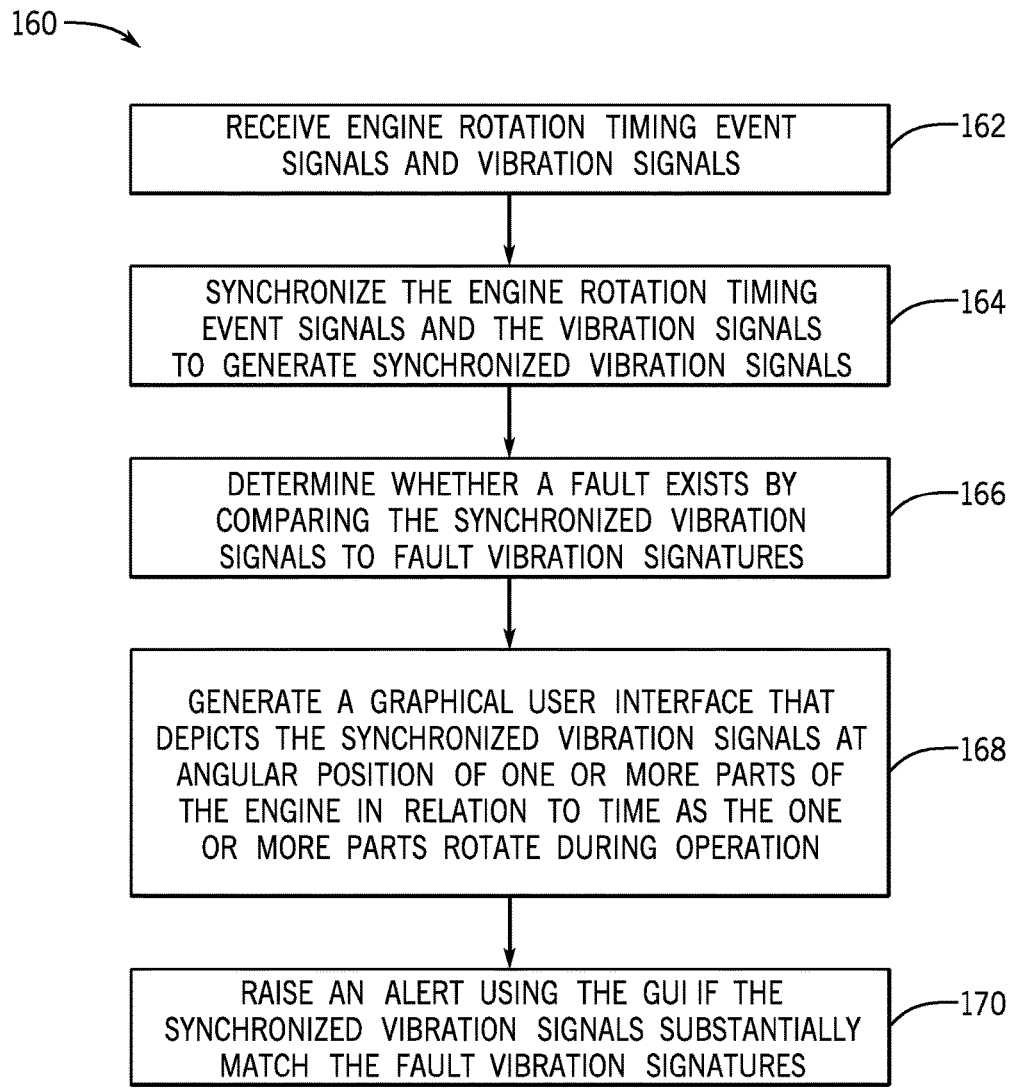
FIG. 5 is a flow diagram of an embodiment of a process suitable for generating a pie chart GUI of any of FIGS. 4A-4C, in accordance with embodiments of the present disclosure.

FIG. 5 is a flow diagram of an embodiment of a process 160 suitable for generating a pie chart GUI representative of synchronized vibration signals in relation to angular positions of components of the engines of FIGS. 1 and 2 over time, in accordance with the present techniques. The process 160 may be implemented as instructions stored on the one or more memories 49 and executed by the one or more processors 48 of the workstation 38.

The process 160 may include receiving engine rotation timing event signals and vibration signals (process block 162). The engine rotation timing event signals may represent the timing of certain engine rotation events, such as the four strokes of an engine, pulse signals of the crankshaft 30 and the camshaft 31, pulse signals of the shaft 70 and the turbine blade, and the like. In some embodiments, the engine rotation timing event signals may be received from the controller (36, 54) and/or from the transceiver 41. The vibration signals may be received from the transceiver 41 or transmitter.

The process 160 may also include synchronizing the engine rotation timing event signals and the vibration signals to generate synchronized vibration signals (process block 164). Synchronizing the signals ensures that the vibration signals reflect the same point in time as the engine rotation events so that the synchronized vibration signals can be compared to certain vibration signatures (e.g., normal and abnormal) stored in the knowledge database 50 for those particular engine rotation events (e.g., the angular position during each stroke).

To that end, the process 160 may include determining whether a fault exists by comparing the synchronized vibration signals to fault vibration signatures, which may be obtained from the knowledge database 50 (process block 166). As discussed above, the processor 49 may determine that a fault exists if the synchronized vibration signals substantially match a fault vibration signature for the components (e.g., camshaft 31 and crankshaft 30) angular positions during a particular stroke or a rotation. Additionally or alternatively, in some embodiments, the processor 49 may determine that a fault exists if the synchronized vibration signals do not substantially match a normal vibration signature, even if the synchronized vibration signals do not substantially match a fault vibration signature.

The process 160 may also include generating a GUI 120 that depicts the synchronized vibration signals at angular positions of the one or more components (e.g., crankshaft 30 and camshaft 31) of the engine in relation to time as the one or more components rotate during operation (e.g., each stroke of an engine cycle). The GUI 120 may display the synchronized vibration signals in near real-time as the signals are received and processed, so a user can diagnose if there are any faults during operation (e.g., any of the strokes). As discussed above, a 360° pie chart provides a beneficial representation of the four strokes of an engine cycle, including mid-strokes, in relation to the time it takes the camshaft 31 and crankshaft 30 to rotate as the piston moves between TDC and BDC. Also, a 90° pie chart may provide a beneficial representation of rotational operation of the shaft 70 and/or turbine blades of the gas turbine 52 over time. Further, the process 160 may also include raising an alert using the GUI 120 if the synchronized vibration signals substantially match the fault vibration signatures (process block 170), do not substantially match normal vibration signatures, or both.

Technical effects of the invention include providing portable engine health monitoring techniques. The techniques may include using a wireless vibration sensor and transceiver that removably couples to the exterior of an engine. The transceiver may receive engine rotation timing event signals from a controller of the engine, and the transceiver may be configured to transmit vibration/sound information and/or engine rotation timing event signals in near real-time to a workstation (e.g., smartphone). A software application executed on the workstation may be configured to synchronize the vibration/sound information with the engine rotation timing event signals to generate synchronized vibration signals and to generate a GUI (e.g., pie chart) that depicts the synchronized vibration signals in relation to angular positions of components of the engine over time as the components rotate during operation (e.g., strokes of the engine cycle). If the vibration signals indicate a fault or failure, one or more alerts may be raised by the GUI.

This written description uses examples to disclose the techniques, including the best mode, and also to enable any person skilled in the art to practice the techniques, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. One or more tangible, non-transitory computer-readable media storing instructions that, when executed by one or more processors, are configured to:
   receive engine rotation timing event signals for one or more components of the engine and vibration signals indicative of movement of the one or more components;
   synchronize the engine rotation timing event signals and the vibration signals to generate synchronized vibration signals that reflect a common point in time between engine rotation timing events related to the engine rotation timing event signals and the vibration signals;
   determine whether a fault exists by comparing the synchronized vibration signals to vibration signatures; and
   generate a graphical user interface (GUI) that depicts the synchronized vibration signals at angular positions of the one or more components in relation to time as the one or more components rotate during operation of the engine.

2. The one or more media of claim 1, wherein the one or more components comprise a camshaft and a crankshaft and the instructions are configured to generate the GUI comprising a pie chart that represents each of four strokes of an engine cycle as a slice of the pie chart, each of the four stroke slices representing a rotation of 90° in angular position of the camshaft and a rotation of 180° in angular position of the crankshaft in relation to time.

3. The one or more media of claim 2, wherein the instructions are configured to, for each of the four stroke slices, generate a first and second mid-stroke slice that represent a rotation of 45° in angular position of the camshaft and a rotation of 90° in angular position of the crankshaft in relation to time.

4. The one or more media of claim 2, wherein the instructions are configured to arrange the four stroke slices on the pie chart as:
   a first stroke slice that covers a time period when the camshaft rotates from 0° to 90° in angular position and the crankshaft rotates from 0° to 180° in angular position;
   a second stroke slice that covers a time period when the camshaft rotates from 90° to 180° in agular position and the crankshaft rotates from 180° to 360° in angular position;

a third stroke slice that covers a time period when the camshaft rotates from 180° to 270° in agular position and the crankshaft rotates from 360° to 540° in angular position; and a fourth stroke slice that covers a time period when the camshaft rotates from 270° to 360° in angular position and the crankshaft rotates from 540° to 720° in angular position.

5. The one or more media of claim 1, wherein the instructions are configured to generate an alert on the GUI when a fault is determined to exist, wherein the alert comprises changing the color of a portion of the GUI, displaying a warning, emitting an audible sound, or some combination thereof.

6. The one or more media of claim 1, wherein the instructions are configured to generate the GUI to illustrate each cylinder of the engine.

7. The one or more media of claim 1, wherein the instructions are configured to determine whether the fault exists by comparing the synchronized vibration signals to the vibration signatures by:
    determining whether the synchronized vibration signals substantially match a fault vibration signature for the one or more components at the respective angular position at the same time; or
    determining whether the synchronized vibration signals do not substantially match a normal vibration signature for the one or more components at the respective angular position at the same time.

8. The one or more media of claim 1, wherein the computer instructions are configured to synchronize the engine rotation timing event signals and the vibration signals by aligning times that the vibration signals were read with the engine rotation timing events.

9. The one or more media of claim 1, wherein the instructions are configured to:
    read the vibration signatures from a data source; and
    write the synchronized vibration signals to the data source when the synchronized vibration signals do not substantially match a normal vibration signature for the camshaft and the crankshaft and the synchronized vibration signals do not substantially match a fault vibration signature for the camshaft and the crankshaft.

10. The one or more media of claim 1, wherein the one or more components comprise a shaft, a turbine blade, or both, the engine comprises a gas turbine, and the instructions are configured to generate the GUI comprising a pie chart that represents rotational operation of the gas turbine as two slices of the pie chart, each of the two slices representing a rotation of 90° in angular position of the shaft, the turbine blade, or both.

11. An electronic device comprising:
    a network interface; and
    a processor configured to:
        receive engine rotation timing event signals for one or more components of the engine and vibration signals indicative of movement of the one or more components from the network interface;
        synchronize the engine rotation timing event signals and the vibration signals to generate synchronized vibration signals that reflect a common point in time between engine rotation timing events related to the engine rotation timing event signals and the vibration signals;
        determine whether a fault exists by comparing the synchronized vibration signals to vibration signatures of the one or more components at respective angular positions; and
        generate a graphical user interface (GUI) that depicts the synchronized vibration signals at angular positions of the one or more components in relation to time as the one or more components rotate during operation of the engine.

12. The electronic device of claim 11, wherein the network interface is communicatively coupled to a multi-channel wireless transceiver and the network interface is configured to receive the engine rotation timing event signals and the vibration signals from the multi-channel wireless transceiver communicatively coupled to a vibration sensor removably coupled to an exterior portion of the engine in proximity to the one or more components.

13. The electronic device of claim 11, comprising a display screen configured to display the GUI.

14. The electronic device of claim 11, wherein the network interface is communicatively coupled to a multi-channel wireless transceiver or transmitter and a controller of the engine, and the network interface is configured to receive the vibration signals from the multi-channel wireless transceiver or transmitter and to receive the engine rotation timing event signals from the controller.

15. The electronic device of claim 11, wherein the one or more components comprise a camshaft and a crankshaft and the processor is configured to generate the GUI comprising a pie chart that represents each of four strokes of an engine cycle as a slice of the pie chart, each of the four stroke slices representing a rotation of 90° in angular position of the camshaft and a rotation of 180° in angular position of the crankshaft in relation to time.

16. The electronic device of claim 15, wherein the processor is configured to modify the GUI to depict the vibration signals at angular positions of the camshaft and the crankshaft in relation to time to enable faults to be depicted at the time of occurrence during rotation of the engine.

17. The electronic device of claim 11, wherein the processor is configured to:
    determine whether the fault exists by accessing a data source stored on the memory or on a memory external to the electronic device and comparing the synchronized vibration signals to baseline vibration signatures for angular positions of the one or more components at the same time; and
    generate an alert on the GUI when the synchronized vibration signals and the baseline vibration signatures do not substantially match.

18. An apparatus comprising:
    a sensor comprising an adhesive or magnetic patch that enables removable coupling of the sensor to an exterior portion of an engine, wherein the sensor is configured to:
        detect vibration signals of one or more components that rotate as the engine operates; and
        transmit the vibration signals for generation of synchronized vibration signals for display via a graphical user interface (GUI) that depicts the synchronized vibration signals at angular positions of the one or more components in relation to time as one or more components rotate during operation of the engine.

19. The apparatus of claim 18, wherein the sensor comprises a transceiver configured to:

receive engine rotation timing event signals from a network interface of an engine controller; and transmit the engine rotation timing event signals for generation of the synchronized vibration signals.

20. The apparatus of claim 19, comprising a workstation configured to:

receive the engine rotation timing event signals and the vibration signals;

synchronize the engine rotation timing event signals and the vibration signals to the generate synchronized vibration signals;

compare the synchronized vibration signals to fault vibration signatures; and generate the GUI.

* * * * *